(12) United States Patent
Melvin, III et al.

(10) Patent No.: US 7,243,332 B2
(45) Date of Patent: *Jul. 10, 2007

(54) METHOD AND APPARATUS FOR IDENTIFYING A MANUFACTURING PROBLEM AREA IN A LAYOUT USING A GRADIENT-MAGNITUDE OF A PROCESS-SENSITIVITY MODEL

(75) Inventors: Lawrence S. Melvin, III, Hillsboro, OR (US); James P. Shiely, Aloha, OR (US); Qiliang Yan, Hillsboro, OR (US)

(73) Assignee: Synopsys, Inc., Mountain View, CA (US)

( * ) Notice: Subject to any disclaimer, the term of this patent is extended or adjusted under 35 U.S.C. 154(b) by 154 days.

This patent is subject to a terminal disclaimer.

(21) Appl. No.: 11/083,656

(22) Filed: Mar. 17, 2005

(65) Prior Publication Data

US 2006/0190913 A1    Aug. 24, 2006

Related U.S. Application Data

(63) Continuation-in-part of application No. 11/065,409, filed on Feb. 24, 2005.

(51) Int. Cl.
 *G06F 17/50* (2006.01)
(52) U.S. Cl. .............................. 716/21; 716/19; 716/20
(58) Field of Classification Search .............. 716/1–21; 703/2; 430/4, 5; 378/19–20, 34–35
See application file for complete search history.

(56) References Cited

U.S. PATENT DOCUMENTS

| | | | |
|---|---|---|---|
| 6,453,457 B1 * | 9/2002 | Pierrat et al. .................. | 716/19 |
| 6,539,521 B1 * | 3/2003 | Pierrat et al. .................. | 716/4 |
| 6,777,138 B2 * | 8/2004 | Pierrat et al. .................. | 430/5 |
| 6,904,587 B2 * | 6/2005 | Tsai et al. ..................... | 716/19 |
| 6,964,032 B2 * | 11/2005 | Liebmann et al. ............. | 716/19 |
| 2002/0164065 A1 * | 11/2002 | Cai et al. ..................... | 382/149 |
| 2003/0121021 A1 * | 6/2003 | Liu et al. ..................... | 716/19 |

* cited by examiner

*Primary Examiner*—Jack Chiang
*Assistant Examiner*—Nghia M. Doan
(74) *Attorney, Agent, or Firm*—Park, Vaughan & Fleming LLP (57) ABSTRACT

One embodiment of the present invention provides a system that identifies an area in a mask layout which is likely to cause manufacturing problems. During operation, the system creates an on-target process model that models a semiconductor manufacturing process under nominal process conditions. The system also creates one or more off-target process models that model the semiconductor manufacturing process under one or more arbitrary process conditions. Next, the system computes a process-sensitivity model using the on-target process model and the off-target process models. The system then computes a gradient-magnitude of the process-sensitivity model. Next, the system identifies a problem area in the mask layout using the gradient-magnitude of the process-sensitivity model. Identifying the problem area allows it to be corrected, which improves the manufacturability of the mask layout.

12 Claims, 6 Drawing Sheets

METHOD AND APPARATUS FOR IDENTIFYING A MANUFACTURING PROBLEM AREA IN A LAYOUT USING A GRADIENT-MAGNITUDE OF A PROCESS-SENSITIVITY MODEL

RELATED APPLICATION

This application is a continuation-in-part of, and hereby claims priority under 35 U.S.C. § 120 to, U.S. patent application Ser. No. 11/065,409, entitled, "METHOD AND APPARATUS FOR IDENTIFYING A MANUFACTURING PROBLEM AREA IN A LAYOUT USING A PROCESS-SENSITIVITY MODEL," by inventors Lawrence S. Melvin III and James P. Shiely filed on $24^{th}$ Feb. 2005.

BACKGROUND

1. Field of the Invention

The present invention is related to integrated circuit fabrication. More specifically, the present invention is related to a method and apparatus for identifying a manufacturing problem area in a layout using a gradient-magnitude of a process-sensitivity model.

2. Related Art

Dramatic improvements in semiconductor integration densities have largely been achieved through corresponding improvements in semiconductor manufacturing technologies.

Semiconductor manufacturing technologies typically include a number of processes which involve complex physical and chemical interactions. Since it is almost impossible to perfectly control these complex physical and chemical interactions, these processes typically have process variations that can cause the characteristics of the actual integrated circuit to be different from the desired characteristics. If this difference is too large, it can lead to manufacturing problems which can reduce the yield and/or reduce the performance of the integrated circuit.

Consequently, to be economically viable, a semiconductor manufacturing process has to be robust with respect to process variations, i.e., it must be able to tolerate a large enough range of process variations. (We describe the present invention in the context of "depth of focus," which usually refers to process variations in photolithography. But, it will be apparent to one skilled in the art that the present invention can be readily applied to include other manufacturing process variations, such as, dose variation, resist thickness variations, etch variations, and doping variations.)

Specifically, improving the depth of focus directly results in cost savings. This is because it can substantially increase the throughput by reducing the amount of time spent on inspection, servicing, and maintenance of the equipment. In addition, the actual process conditions encountered during manufacturing may vary due to a variety of reasons. For example, topographical variations on the wafer can occur due to imperfections in the chemical-mechanical polishing process step. As a result, improving the depth of focus can increase the yield for chips that are manufactured in the presence of these process variations.

Unfortunately, improving depth of focus can be very challenging, especially at deep submicron dimensions. To improve the manufacturability of integrated circuits, designers typically use design rule tables that specify what size and shapes of features may be drawn in a design. Unfortunately, at deep submicron dimensions, design rule tables can be extremely large and unwieldy. Moreover, design rule tables can be overly restrictive which can prevent designers from being able to achieve the best device performance.

Hence, what is needed is a method and an apparatus to identify a manufacturing problem area in a mask layout so that it can be corrected, thereby improving the manufacturability of the mask layout.

SUMMARY

One embodiment of the present invention provides a system that identifies an area in a mask layout which is likely to cause manufacturing problems. During operation, the system creates an on-target process model that models a semiconductor manufacturing process under nominal (e.g., optimal) process conditions. The system also creates one or more off-target process models that model the semiconductor manufacturing process under one or more arbitrary (e.g., non-optimal) process conditions. Next, the system computes a process-sensitivity model using the on-target process model and the off-target process models. Note that a process model (on-target, off-target, or process-sensitivity) can be represented by a multidimensional (e.g., 2-D) function. The system then computes a gradient-magnitude of the process-sensitivity model. Next, the system identifies a problem area in the mask layout using the gradient-magnitude of the process-sensitivity model. Specifically, the system can compute a problem-indicator by convolving the gradient-magnitude of the process-sensitivity model with a multidimensional function that represents the mask layout. Next, the system can identify the problem area by comparing the value of the problem-indicator with a threshold. Note that identifying the problem area allows it to be corrected, which improves the manufacturability of the mask layout. Moreover, using the gradient-magnitude of the process-sensitivity model to identify the problem area reduces the computational time required to identify the problem area. Specifically, the gradient-magnitude of the process-sensitivity model allows multiple process conditions to be explored at once. Furthermore, the gradient-magnitude of the process-sensitivity model directly identifies the problem areas for the end-user. As a result, the end-user does not need to perform any complex calculations to determine qualitatively or quantitatively the amount of process error associated a feature or group of features.

In a variation on this embodiment, the system creates the on-target process model by fitting an analytical model to process data for the semiconductor manufacturing process under nominal (e.g., optimal) process conditions.

In a variation on this embodiment, the system creates the one or more off-target process models by fitting an analytical model to process data for the semiconductor manufacturing process under arbitrary (e.g., non-optimal) process conditions.

In a variation on this embodiment, the system operates before an optical proximity correction (OPC) process is performed on the mask layout. In another variation on this embodiment, the system operates after an OPC process is performed on the mask layout.

In a variation on this embodiment, the semiconductor manufacturing process can include: photolithography, etch, chemical-mechanical polishing (CMP), trench fill, or reticle manufacture.

In a variation on this embodiment, the system operates before OPC is applied, but after other resolution enhancement techniques are applied to the mask layout. In another variation on this embodiment, the system operates after one or more resolution enhancement techniques (including OPC) are applied to the mask layout. Note that resolution enhancements techniques can include, but are not limited to, alternating phase shift mask, assist features, dual dipole illumination, chromeless phase lithography (CPL), or other illumination techniques.

DETAILED DESCRIPTION

Integrated Circuit Design and Fabrication

Figure 1:
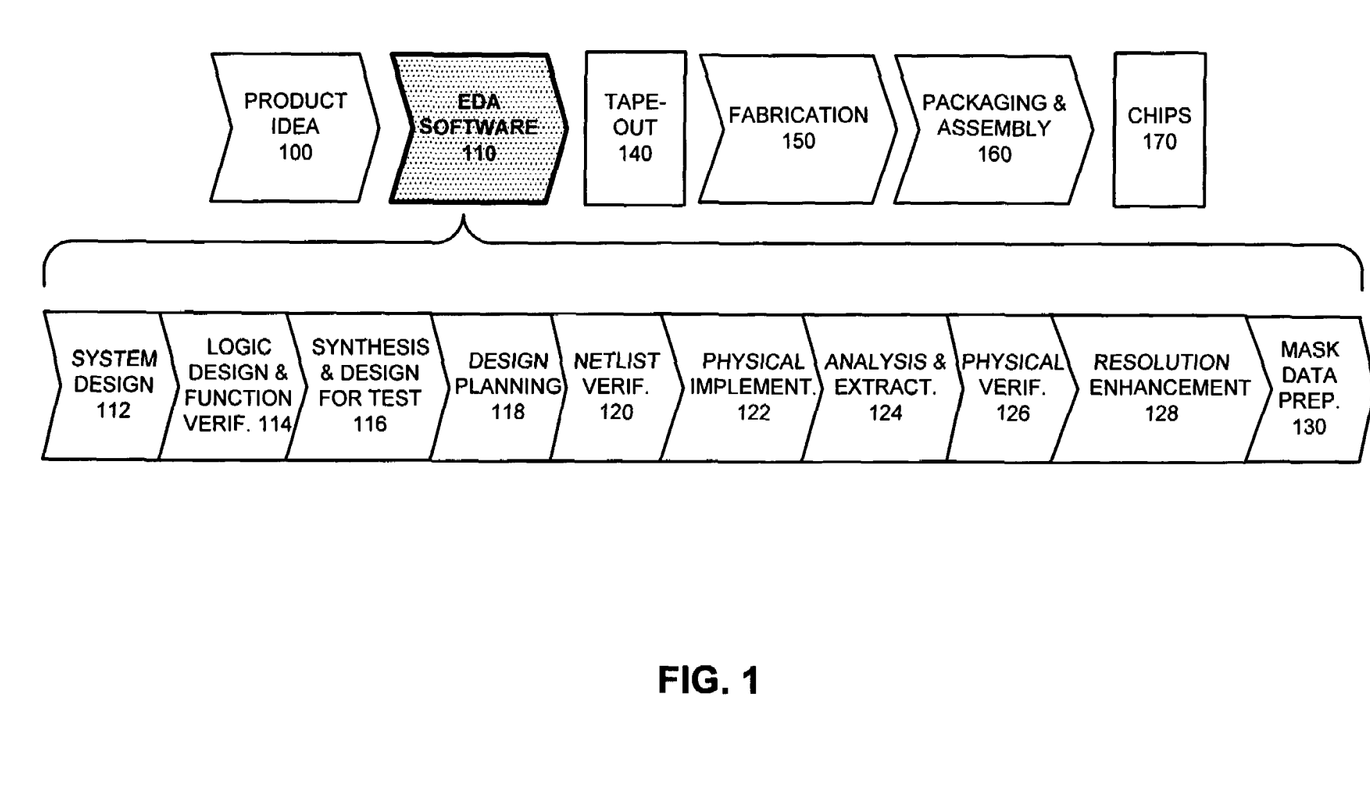
FIG. 1 illustrates various steps in the design and fabrication of an integrated circuit in accordance with an embodiment of the present invention.

FIG. 1 illustrates various steps in the design and fabrication of an integrated circuit in accordance with an embodiment of the present invention. The process starts with a product idea (step 100). Next, the product idea is realized using an integrated circuit, which is designed using Electronic Design Automation (EDA) software (step 110). Once the circuit design is finalized, it is taped-out (step 140). After tape-out, the process goes through fabrication (step 150), packaging, and assembly (step 160). The process eventually culminates with the production of chips (step 170).

The EDA software design step 110, in turn, includes a number of sub-steps, namely, system design (step 112), logic design and function verification (step 114), synthesis and design for test (step 116), design planning (step 118), netlist verification (step 120), physical implementation (step 122), analysis and extraction (step 124), physical verification (step 126), resolution enhancement (step 128), and mask data preparation (step 130).

The present invention can be used during one or more of the above described steps. Specifically, the SiVL® product from Synopsys, Inc. can be suitably modified to use the present invention to identify problem areas in a mask layout.

Process Variations

Semiconductor manufacturing technologies typically include a number of processes which involve complex physical and chemical interactions. Since it is almost impossible to perfectly control these complex physical and chemical interactions, these processes typically have process variations that can cause the characteristics of the actual integrated circuit to be different from the desired characteristics. If this difference is too large, it can lead to manufacturing problems which can reduce the yield and/or reduce the performance of the integrated circuit.

Process variations can arise due to a variety of reasons. For example, in photolithography, variations in the rotation speed of the spindle can cause the resist thickness to vary, which can cause variations in the reflectivity, which, in turn, can cause unwanted changes to the pattern's image. Similarly, bake plates—which are used to drive the solvents out of the wafer and form the pattern in photoresist—can have hot or cold spots, which can cause variations in the critical dimension (CD). Likewise, the chuck that holds the wafer during photo exposure can contain microparticles which create "hills" on the wafer's surface that can cause defocusing during lithography. Note that defocusing can also occur because the chuck is out of level, or the lens has aberrations, or the wafer is not completely flat, amongst other reasons.

It is helpful to classify process variations into two types: random and systematic. (Note that the term "depth of focus" is often used as a catch all term to describe the amount of random and systematic process variations.) Random process variations are those process variations that are not presently being modeled using an analytical model. On the other hand, systematic process variations are those process variations that are typically modeled using analytical models. For example, spindle speed variation is typically classified as a random process variation, while pattern corner rounding has been compensated for in a systematic manner. Note that, researchers are continually trying to convert random process variations into systematic process variations by creating new analytical models that model random process variations.

Manufacturing Problems

To be economically viable, a semiconductor manufacturing process has to be robust with respect to process variations, i.e., it must be able to tolerate a large enough range of process variations. Note that, improving the robustness (or depth of focus) of a process directly results in cost savings. This is because improving depth of focus reduces the amount of time spent on inspection, servicing, and maintenance of the equipment, thereby increasing the number of wafers that are run. Furthermore, improving the depth of focus can increase the yield. Due to these reasons, increasing depth of focus can substantially increase profits.

Moreover, the importance of improving depth of focus increases as a manufacturing process shifts to smaller dimensions because the inherent depth of focus in these processes becomes rapidly smaller. Specifically, at deep submicron dimensions, even a small improvement in the depth of focus can save millions of dollars in manufacturing costs.

Unfortunately, improving depth of focus can be very challenging, especially at deep submicron dimensions. To improve the manufacturability of integrated circuits, designers typically use design rule tables that specify when and how to draw circuit features. Unfortunately, at deep submicron dimensions, these design rule tables can be extremely large and unwieldy. Moreover, design rule tables can be overly restrictive which can needlessly prevent designers from being able to achieve the best performance.

Identifying Manufacturing Problem Areas in a Mask Layout

One of the holy grails of semiconductor manufacturing is to, in one fell swoop, get all the process variation information at a point on a mask layout. If we achieve this holy grail, we can identify and correct problem areas in a mask layout before the pattern is manufactured, thereby improving the manufacturability of the mask layout. For example, if we know that a line-end is likely to pull back 40 nm during manufacturing, the designer can use this information to resize the pattern while it is being drawn.

Furthermore, it is very important that we identify these problem areas without using a substantial amount of computational time. Note that, problem areas can be identified by simulating various process conditions and by comparing the resulting patterns to determine areas that can cause manufacturability problems. Unfortunately, this approach can require a substantial amount of computational time because it involves running multiple complex simulation models (e.g., OPC models).

Instead, what is needed is a process that can quickly tell us whether a structure is going to be stable (i.e., it is going to print properly so that it functions according to the design tolerances) within a workable process window. (Note that determining whether a structure is stable or not depends on the type of the layer. For example, in a metal layer, significant CD variations may be acceptable as long as they do not cause a short or an open in the circuit. In contrast, in a polysilicon layer, even very small CD variations may be unacceptable.)

One embodiment of the present invention provides a system for identifying an area in a mask layout which is likely to cause manufacturing problems. Specifically, in one embodiment of the present invention, the system uses a gradient-magnitude of a "process-sensitivity model" (which can be represented using a set of basis functions) to query a pattern and generate a problem indicator that indicates the gradient-magnitude of the amount of process variation that is expected to occur at any point on mask layout. Based on the gradient-magnitude of the amount of process variation, the designer can decide whether it is likely to cause problems during manufacturing and take appropriate counter measures, such as, moving or widening the feature.

Furthermore, in one embodiment of the present invention, the system uses the computed problem indicator to generate a contour. Specifically, the contour can be generated by comparing the problem-indicator with a threshold. Note that generating a contour can be very useful because it interprets the process variation data and identifies the problem areas directly. Moreover the contour can be displayed using a standard optical intensity viewing tool such as the ICWorkbench® tool from Synopsys.

Note that a key advantage of this invention is that it can capture all the process-sensitivity information in a single multidimensional function. (Note that, to improve computational efficiency, a multidimensional function is often represented using a linear combination of a set of multidimensional functions, which are typically called basis functions. But, from a mathematical standpoint, the gradient-magnitude of the process-sensitivity model can still be viewed as a single multidimensional function.) Furthermore, this allows the system to directly identify the problem area. Specifically, the system can quickly compute a problem-indicator by simply convolving the gradient-magnitude of the process-sensitivity model with another multidimensional function that represents the mask layout. The system can then compare the problem-indicator with a threshold to identify a manufacturing problem area, thereby substantially reducing the amount of computational time required to identify the manufacturing problem area.

Figure 2:
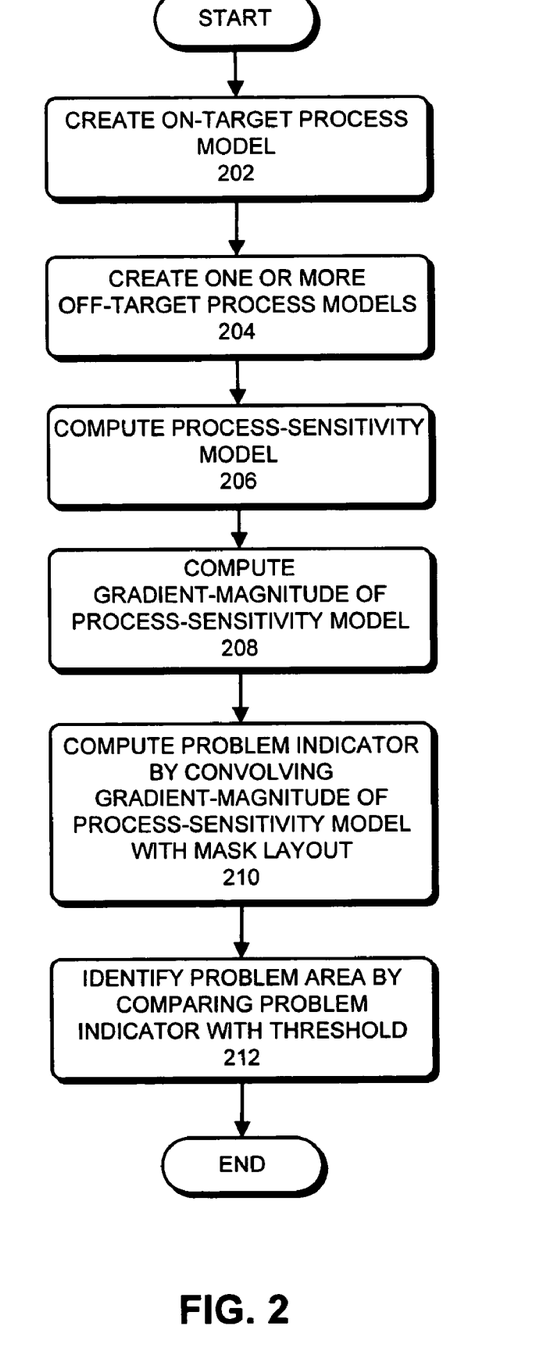
FIG. 2 presents a flowchart that illustrates the process of identifying a problem area using a gradient-magnitude of a process-sensitivity model in accordance with an embodiment of the present invention.

Using a Gradient-Magnitude of a Process-Sensitivity Model to Identify a Problem Area FIG. 2 presents a flowchart that illustrates the process of identifying a problem area using a gradient-magnitude of a process-sensitivity model in accordance with an embodiment of the present invention.

The process starts by creating an on-target process model that models a semiconductor processing technology under nominal (e.g., optimal) process conditions (step 202). Note that the semiconductor processing technology can include photolithography, etch, chemical-mechanical polishing (CMP), trench fill, and/or other technologies and combinations of the foregoing.

Next, the system creates one or more off-target process models that model the semiconductor processing technology under one or more arbitrary (e.g., non-optimal) process conditions (step 204).

In one embodiment of the present invention, an on-target (or off-target) process model is represented by a multidimensional function. In another embodiment of the present invention, an on-target (or off-target) process model is represented using a set of basis functions. Furthermore, in one embodiment of the present invention, creating an on-target process model involves fitting an analytical model to process data for the semiconductor manufacturing process under nominal (e.g., optimal) process conditions. On the other hand, creating the one or more off-target process models can involve fitting an analytical model to process data for the semiconductor manufacturing process under arbitrary (e.g., non-optimal) process conditions. Note that, in one embodiment of the present invention, the one or more off-target process models can be created by analytically perturbing the on-target process model.

The system then computes a process-sensitivity model using the on-target process model and one or more off-target process models (step 206).

Figure 3A:
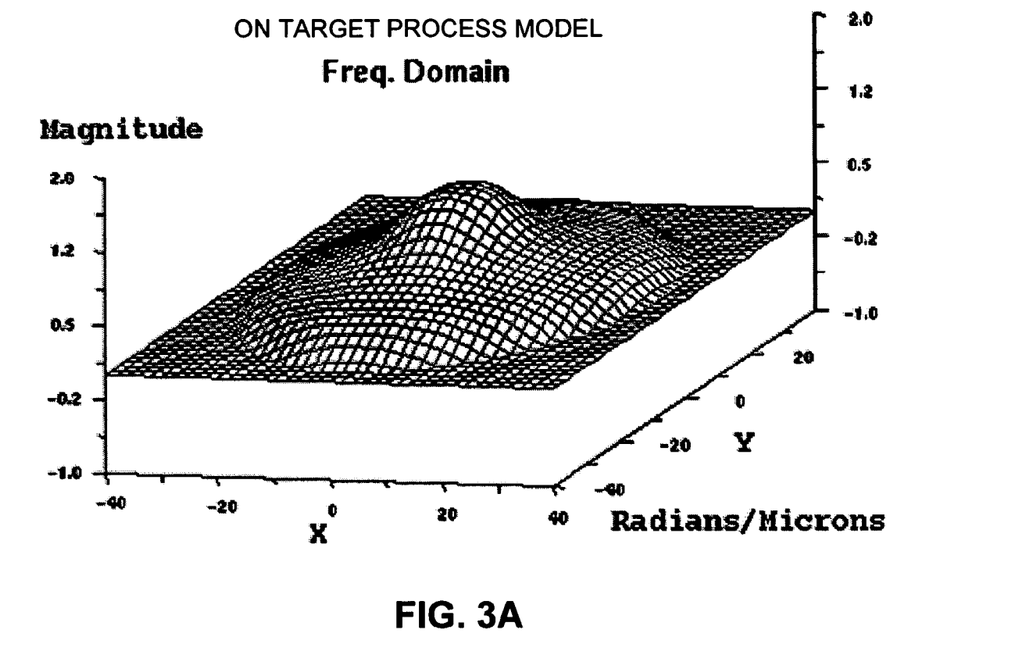
FIG. 3A illustrates a plot of a 2-D function that represents an on-target process model in accordance with an embodiment of the present invention.

FIG. 3A illustrates a plot of a 2-D function that represents an on-target process model in accordance with an embodiment of the present invention.

Figure 3B:
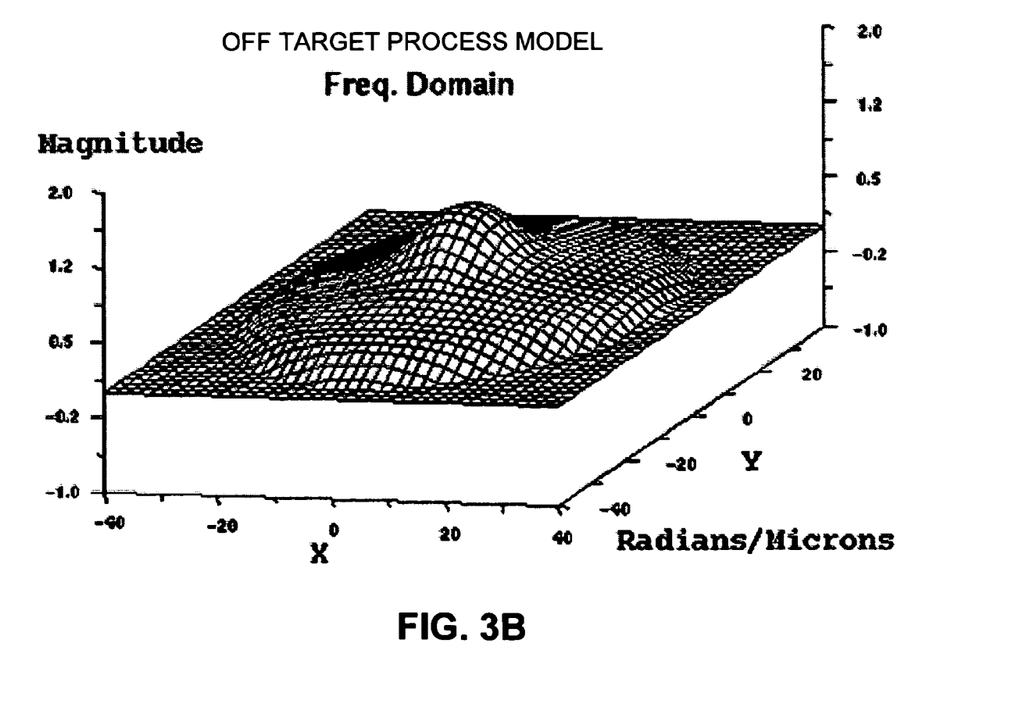
FIG. 3B illustrates a plot of a 2-D function that represents an off-target process model in accordance with an embodiment of the present invention.

FIG. 3B illustrates a plot of a 2-D function that represents an off-target process model in accordance with an embodiment of the present invention.

Figure 3C:
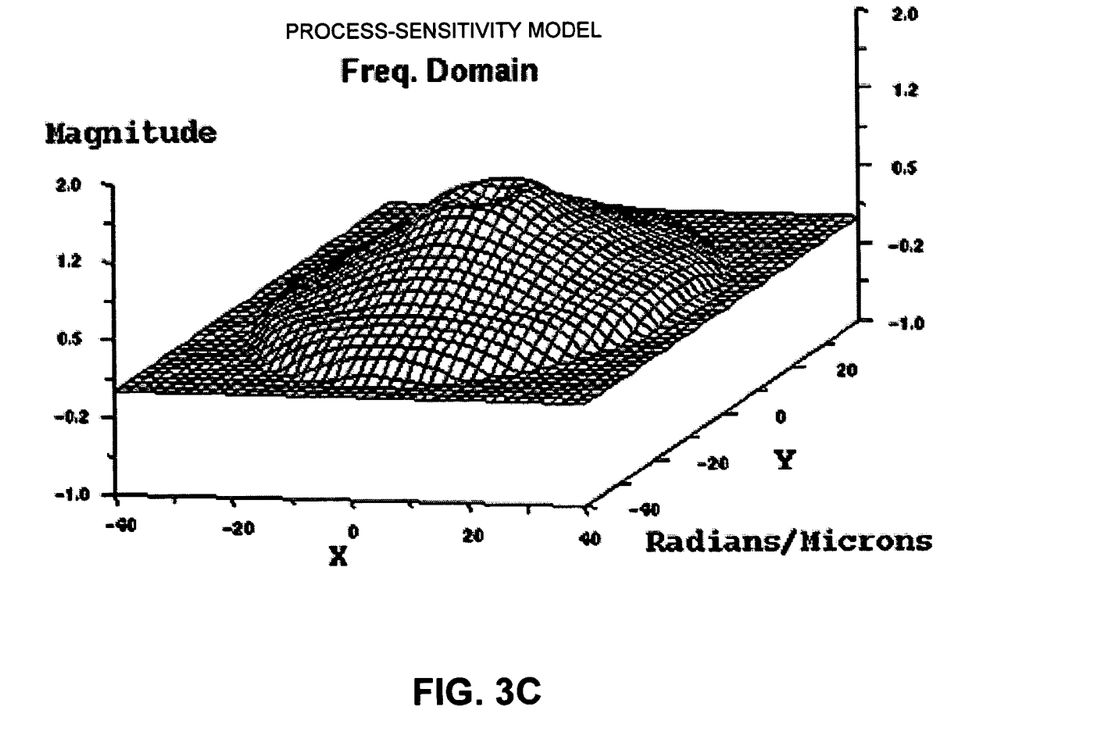
FIG. 3C illustrates a plot of a 2-D function that represents a process-sensitivity model in accordance with an embodiment of the present invention.

FIG. 3C illustrates a plot of a process-sensitivity model in accordance with an embodiment of the present invention.

Note that the 2-D functions illustrated in FIG. 3A and FIG. 3B represent the on-target and the off-target process models, respectively, in the spatial frequency domain. Furthermore, in FIG. 3A, FIG. 3B, and FIG. 3C, the X and Y axes identify a spatial-frequency component (in units of radians per micron), whereas the Z axis indicates the magnitude of a specific spatial-frequency component. These process models can also be represented using a 2-D function in a different domain, such as, the space domain.

In one embodiment of the present invention, the system computes the process-sensitivity model by subtracting each off-target process model in the one or more off-target process models from the on-target process model. Note that the process-sensitivity model models the pattern features that are lost during defocus.

Specifically, consider the optical lithography case. Let $P_t$ represent an on-target process model, i.e., let $P_t$ model the optical lithography process when it is in focus. Furthermore, let $P_d$ represent an off-target process model, e.g., let $P_d$ model the optical lithography process when it is defocused. Now, the process-sensitivity model, $F_p$ can be computed as follows: $F_p = (P_t - P_d)/\Delta P_d$, where $\Delta P_d$ is the focus offset (in units of length).

Note that in the above example, we only considered a single off-target process model. But, we can have two or more off-target process models. In general, the process-sensitivity model, $F_p$, can be computed as follows:

$$F_p = \frac{1}{n}\left(\frac{1}{\Delta P_1}(P_t - P_1) + \frac{1}{\Delta P_2}(P_t - P_2) + \ldots + \frac{1}{\Delta P_n}(P_t - P_n)\right),$$

where, $P_{1 \ldots n}$ are off-target process models that model arbitrary (e.g., non-optimal) process conditions, $P_t$ is the on-target process model that models a nominal (e.g., optimal) process condition, and $\Delta P_{1 \ldots n}$ are the respective changes in the process conditions between the nominal process condition and the arbitrary (1 . . . n) process conditions.

For example, let $P_t$ model the optical lithography process when it is in focus. Furthermore, let $P_{dn}$ model the optical lithography process when it is negatively defocused, i.e., the distance between the lens and the wafer is less than the on-target distance. Additionally, let $P_{dp}$ model the optical lithography process when it is positively defocused, i.e., the distance between the lens and the wafer is larger than the on-target distance. Now, the process-sensitivity model, $F_p$, can be computed as follows:

$$F_p = \frac{1}{2}\left(\frac{(P_0 - P_{dn})}{\Delta P_{dn}} + \frac{(P_0 - P_{dp})}{\Delta P_{dp}}\right),$$

where $\Delta P_{dn}$ and $\Delta P_{dp}$ are the negative and positive focus offsets (in units of length).

Note that, $(P_t - P_{dn})/\Delta P_{dn}$ and $(P_t - P_{dp})/\Delta P_{dp}$ model the pattern features that are lost during negative and positive defocusing, respectively. In the above example, we compute the process-sensitivity model, $F_p$, by adding $(P_t - P_{dn})/\Delta P_{dn}$ and $(P_t - P_{dp})\Delta P_{dp}$, and by dividing by 2 to normalize the process-sensitivity model. (Note that normalization is not necessary for the invention to work.)

The system then computes a gradient-magnitude of the process-sensitivity model (step 208). Note that the term "gradient-magnitude" can broadly refer to a rate of change of the process-sensitivity model. Furthermore, it will also be apparent that the gradient-magnitude for the process-sensitivity model can be computed using a variety of mathematical formulae. Specifically, in one embodiment of the present invention, the system computes the gradient-magnitude of the process-sensitivity model, $G_p$, as follows:

$$G_p = \left|\nabla \frac{1}{n}\left(\frac{1}{\Delta P_1}(P_t - P_1) + \frac{1}{\Delta P_2}(P_t - P_2) + \ldots + \frac{1}{\Delta P_n}(P_t - P_n)\right)\right|,$$

where, $P_{1 \ldots n}$ are off-target process models that model arbitrary (e.g., non-optimal) process conditions, $P_t$ is the on-target process model that models a nominal (e.g., optimal) process condition, and $\Delta P_{1 \ldots n}$ are the respective changes in the process conditions between the nominal process condition and the arbitrary (1 . . . n) process conditions.

Next, the system identifies a problem area in the mask layout using the gradient-magnitude of the process-sensitivity model. Specifically, the system first computes a problem indicator by convolving the gradient-magnitude of the process-sensitivity model with a multidimensional (e.g., 2-D) function that represents the mask layout (step 210). (Note that, the convolution operation is typically performed in the space domain.)

Next, the system identifies the problem area in the mask layout by comparing the value of the problem-indicator with a threshold to identify the problem area in the mask layout (step 212).

Note that, by using appropriate off-target process models, the above described process can readily identify manufacturing problems that occur due to various mask-layout related reasons.

Figure 4:
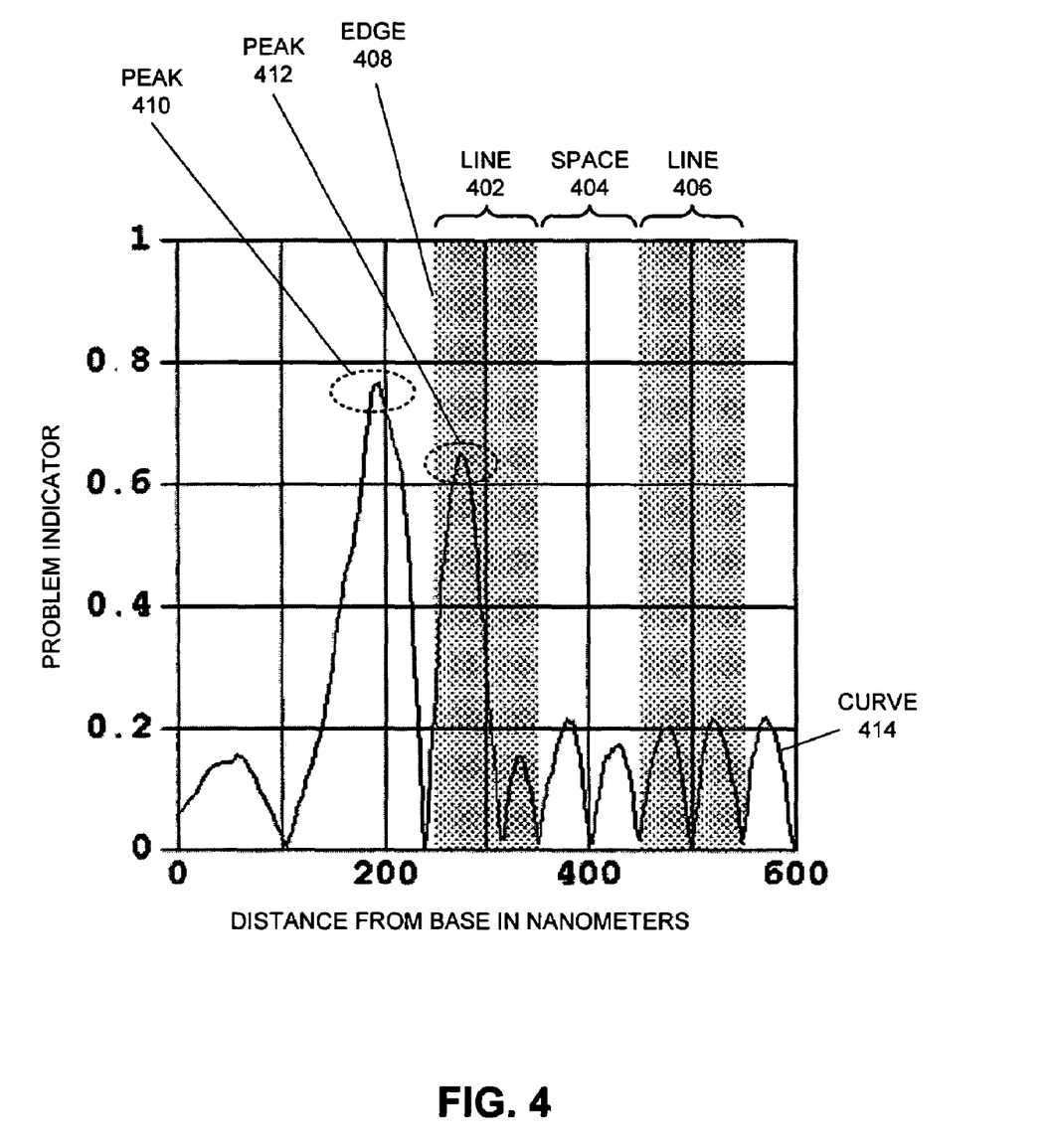
FIG. 4 illustrates a 1-D plot of the problem-indicator across an edge-line and its neighbor in accordance with one embodiment of the present invention.

FIG. 4 illustrates a 1-D plot of the problem-indicator across an edge-line and its neighbor in accordance with one embodiment of the present invention. Note that, although the problem indicator is typically a 2-D function, it has been illustrated in FIG. 4 as a 1-D function for the sake of clarity. The X axis corresponds to a location along a straight line in the mask layout, whereas the Y axis corresponds to the value of the problem indicator at that location.

Line 402, space 404, and line 406 are part of a mask layout. Curve 414 is a 1-D plot of the problem-indicator. Note that the problem-indicator has a high magnitude (peaks 410 and 412) on either side of edge 408, which is at the end of a line-and-space pattern. These peaks (410 and 412) indicate a potential manufacturing problem in the proximity of edge 408. (Note that, in contrast, the problem-indicator does not have a high magnitude near the edges of line 406.)

Figure 5:
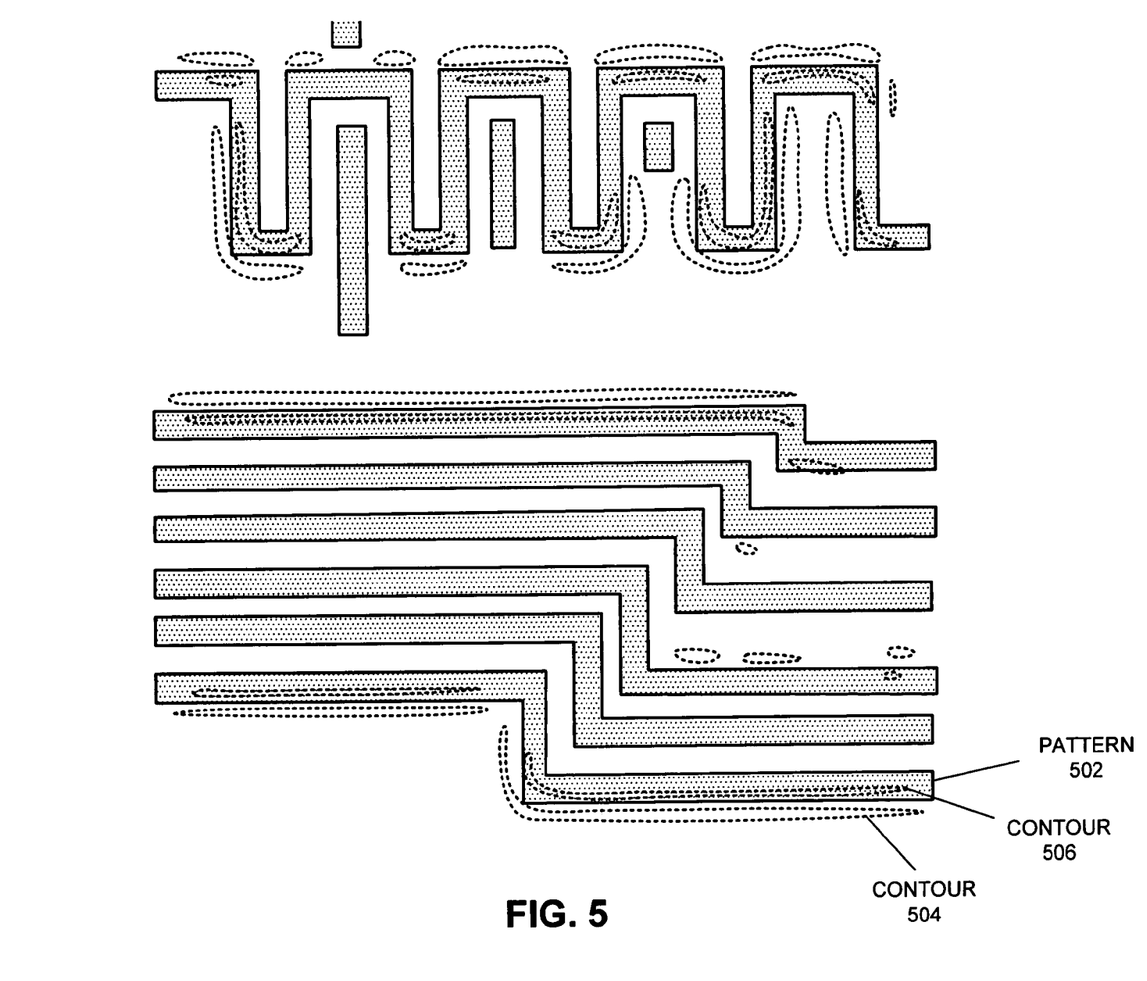
FIG. 5 illustrates how a gradient-magnitude of a process-sensitivity model can be used to identify an area in a mask layout which is likely to cause manufacturing problems in accordance with an embodiment of the present invention.

FIG. 5 illustrates how a gradient-magnitude of a process-sensitivity model can be used to identify an area in a mask layout which is likely to cause manufacturing problems in accordance with an embodiment of the present invention.

The mask layout shown in FIG. 5 includes a number of uncorrected patterns, such as pattern 502. Note that, once these patterns are corrected using OPC, they can be used to create desired patterns on a wafer (not shown for the sake of clarity). In one embodiment of the present invention, the system uses the gradient-magnitude of the process-sensitivity model to generate a contour, such as contour 504, to clearly identify areas (or regions) in the mask layout that can cause manufacturing problems.

For example, contours 504 and 506 clearly identify an area on pattern 502 that can potentially cause manufacturing problems. Note that the system generates these contours by comparing a problem indicator with a problem threshold. Furthermore, in another embodiment, the system can generate multiple contours by comparing the problem indicator with multiple problem thresholds, wherein each problem threshold is associated with a problem severity. Moreover, in one embodiment of the present invention, the system displays the contours using a standard optical intensity viewing tool.

Note that the above described process that uses the gradient-magnitude of a process-sensitivity model to identify manufacturing problems can be used to identify manufacturing problems that occur due to various mask-layout related reasons. These include, but are not limited to, space/polygon interactions, assist features, or forbidden pitches.

Furthermore, the system can identify problem areas in an uncorrected, partially corrected, or completely corrected mask layout. For example, the system can identify problem areas in a mask layout before an OPC process is performed on the mask layout. Specifically, in one embodiment of the present invention, the system adjusts the problem threshold to effectively compensate for the OPC on the uncorrected pattern.

On the other hand, the system typically operates after certain resolution enhancement techniques (RETs) have been applied to the mask layout. These RETs include, but are not limited to, alternating phase shift mask, assist features, dual dipole illumination, or chromeless phase lithography (CPL).

Note that the system can operate before an OPC process is performed because an OPC process usually does not substantially change the spatial frequency components or phase characteristics of a mask layout. On the other hand, assist features, for example, can substantially change the spatial frequency components of a mask layout. Hence, these RETs are usually performed before the system is used to identify problem areas in a mask layout.

CONCLUSION

The data structures and code described in the foregoing description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Furthermore, the foregoing descriptions of embodiments of the present invention have been presented only for purposes of illustration and description. They are not intended to be exhaustive or to limit the present invention to the forms disclosed. Accordingly, many modifications and variations will be readily apparent. Additionally, the above disclosure is not intended to limit the present invention. The scope of the present invention is defined by the appended claims.

What is claimed is:

1. A method for identifying a potentially problematic area in a mask layout, the method comprising:
   determining a process-sensitivity model using an on-target process model and one or more off-target process models, wherein the on-target process model models a semiconductor manufacturing process under nominal process conditions, wherein the one or more off-target process models model the semiconductor manufacturing process under process conditions that are different from the nominal process conditions, and wherein the process-sensitivity model models sensitivity to variations in process conditions;
   determining a gradient-magnitude of the process-sensitivity model; and
   identifying a problem area in a mask layout by: using the gradient-magnitude of the process sensitivity model;
      determining a problem-indicator by convolving the gradient-magnitude of the process-sensitivity model with a multidimensional function that represents the mask layout; and
      comparing the value of the problem-indicator with a threshold wherein identifying the problem area allows the problem area to be corrected, thereby improving the manufacturability of the mask layout; and wherein using the gradient-magnitude of the process-sensitivity model to identify the problem area reduces the computational time required to identify the problem area.

2. The method of claim 1, wherein determining the process-sensitivity model using the on-target process model and the one or more off-target process models involves subtracting each off-target process model in the one or more off-target process models from the on-target process model.

3. The method of claim 1, wherein the on-target process model is determined by fitting an analytical model to process data for the semiconductor manufacturing process under nominal process conditions;
   wherein the one or more off-target process models are determined by fitting an analytical model to process data for the semiconductor manufacturing process under process conditions that are different from the nominal process conditions.

4. The method of claim 1, wherein the method is performed before an optical proximity correction (OPC) process is performed on the mask layout.

5. The method of claim 1, wherein the semiconductor manufacturing process can include:
   photolithography;
   etch;
   chemical-mechanical polishing (CMP);
   trench fill; or
   reticle manufacture.

6. The method of claim 1, wherein the method is performed after one or more resolution enhancement techniques have been applied to the mask layout, wherein the resolution enhancement techniques can include:
   alternating phase shift mask;
   assist features;
   dual dipole illumination; or
   chromeless phase lithography (CPL).

7. A computer-readable storage medium storing instructions that when executed by a computer cause the computer to perform a method for identifying a potentially problematic area in a mask layout, the method comprising:
   determining a process-sensitivity model using an on-target process model and one or more off-target process models, wherein the on-target process model models a semiconductor manufacturing process under nominal process conditions, wherein the one or more off-target process models model the semiconductor manufacturing process under process conditions that are different from the nominal process conditions, and wherein the process-sensitivity model models sensitivity to variations in process conditions;
   determining a gradient-magnitude of the process-sensitivity model; and
   identifying a problem area in a mask layout by: using the gradient-magnitude of the process sensitivity model;
      determining a problem-indicator by convolving the gradient-magnitude of the process-sensitivity model with a multidimensional function that represents the mask layout; and
      comparing the value of the problem-indicator with a threshold wherein identifying the problem area allows the problem area to be corrected, thereby improving the manufacturability of the mask layout; and wherein using the gradient-magnitude of the process-sensitivity model to identify the problem area reduces the computational time required to identify the problem area.

8. The computer-readable storage medium of claim 7, wherein determining the process-sensitivity model using the on-target process model and the one or more off-target process models involves subtracting each off-target process model in the one or more off-target process models from the on-target process model.

9. The computer-readable storage medium of claim 7, wherein the on-target process model is determined by fitting an analytical model to process data for the semiconductor manufacturing process under nominal process conditions;

wherein the one or more off-target process models are determined by fitting an analytical model to process data for the semiconductor manufacturing process under process conditions that are different from the nominal process conditions.

10. The computer-readable storage medium of claim 7, wherein the method is performed before an optical proximity correction (OPC) process is performed on the mask layout.

11. The computer-readable storage medium of claim 7, wherein the semiconductor manufacturing process can include:

photolithography;

etch;

chemical-mechanical polishing (CMP);

trench fill; or reticle manufacture.

12. The computer-readable storage medium of claim 7, wherein the method is performed after one or more resolution enhancement techniques have been applied to the mask layout, wherein the resolution enhancement techniques can include:

alternating phase shift mask;

assist features;

dual dipole illumination; or chromeless phase lithography (CPL).

* * * * *